United States Patent [19]

Laue

[11] Patent Number: 5,429,014

[45] Date of Patent: Jul. 4, 1995

[54] ADJUSTABLE PEDAL ROD AND METHOD OF MAKING SAME

[76] Inventor: Charles E. Laue, 1041 Pawnee Rd., Wilmette, Ill. 60091

[21] Appl. No.: 45,654

[22] Filed: Apr. 9, 1993

[51] Int. Cl.6 .................. G05G 1/00; B21D 39/03
[52] U.S. Cl. .................. 74/586; 74/579 R; 74/593; 29/428; 72/377
[58] Field of Search .............. 74/586, 587, 579 R, 74/522, 594, 593; 29/428 X; 72/377 X; 403/320

[56] References Cited

U.S. PATENT DOCUMENTS

| 1,196,524 | 8/1916 | Cluett | 74/586 X |
| 2,701,733 | 2/1955 | Frevik et al. | 74/586 X |
| 3,496,800 | 2/1970 | Brezinski | 74/586 |
| 3,786,695 | 1/1974 | Barett | 74/586 |
| 4,012,967 | 3/1977 | Warren | 74/586 |
| 4,146,340 | 3/1979 | Smith | 74/586 X |
| 4,218,156 | 8/1980 | Logan | 403/320 |
| 4,295,389 | 10/1981 | Geisthoff et al. | 74/586 |
| 4,667,530 | 5/1987 | Mettler et al. | 74/586 X |
| 4,953,894 | 9/1990 | Broszat et al. | 74/522 X |
| 5,026,254 | 6/1991 | Ford et al. | 74/586 X |

FOREIGN PATENT DOCUMENTS 937424 11/1973 Canada .................. 74/586

Primary Examiner—Vinh T. Luong
Attorney, Agent, or Firm—Hill, Steadman & Simpson

[57] ABSTRACT

An adjustable, pre-set, threaded and torqued pedal rod has a shaft part and a head part which are selectively adjusted and assembled with the use of screw threads to a pre-selected longitudinal mean dimension and then securely crimped to lock the parts together so that the two parts cannot be separated without total destruction. Screw threads of different size are disposed on two separate tiers to afford torque locking.

8 Claims, 2 Drawing Sheets

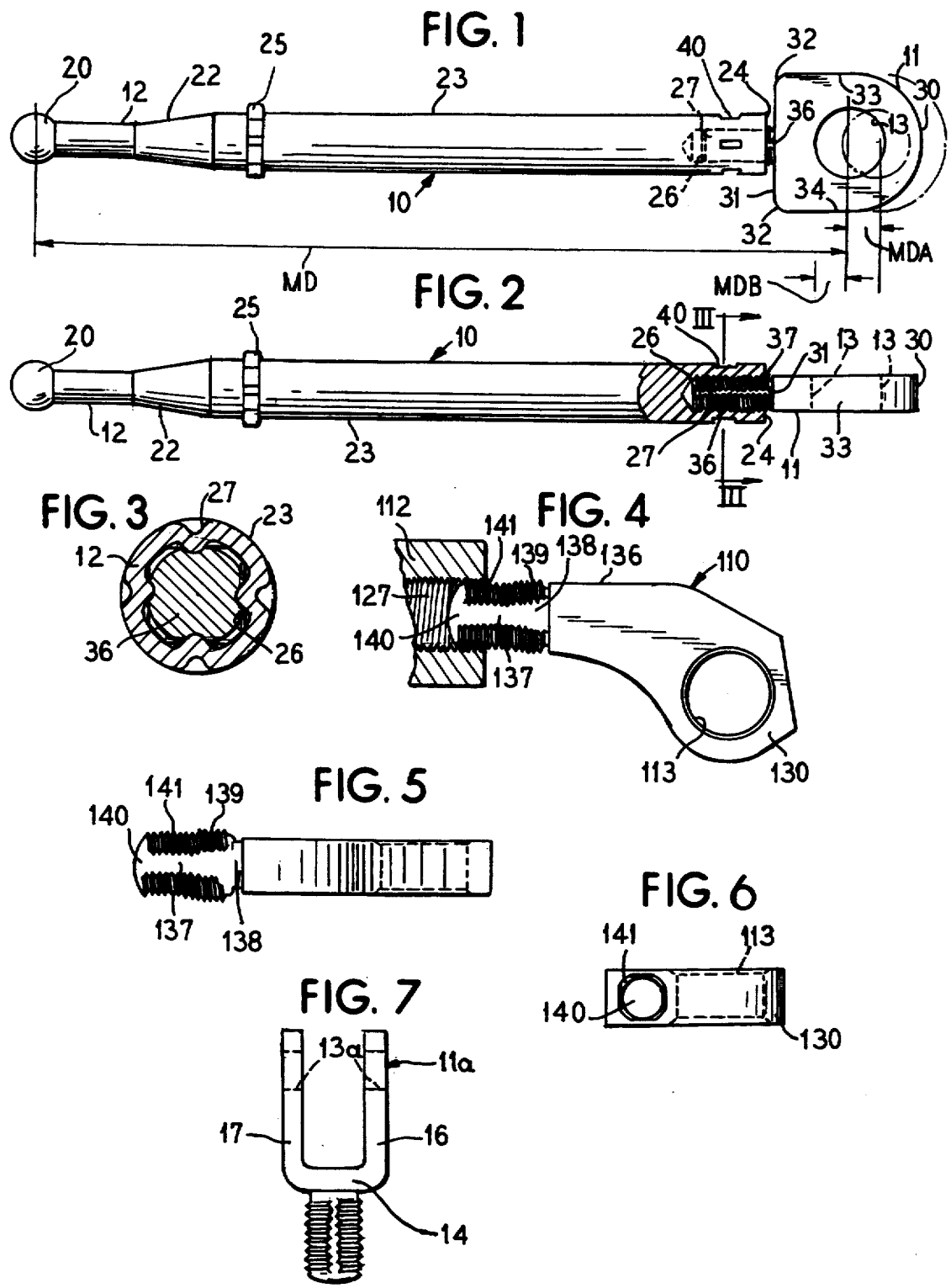

ADJUSTABLE PEDAL ROD AND METHOD OF MAKING SAME

BACKGROUND OF THE INVENTION

Field of the Invention

This invention relates specifically to pedal rods used particularly in vehicular installations for the purpose of actuating brakes, clutches and other devices which are operated by the pedal extremities of a vehicular user.

The Prior Art

A pedal rod is oftentimes used as one of the essential operating parts of an automotive vehicle. In such an application, the pedal rod is physically embodied in the power train of a mechanical device such a brake and wherein pressure applied by the foot of the operator is transmitted to the braking mechanism via the pedal rod.

Heretofore, a particularly popular form of pedal rod widely employed throughout the automobile industry has been a hot forged article. With such a prior art pedal rod made as a hot forged article, the axial dimension size of the element is prefixed because it is so mandated by the mode of manufacture which depends on the manufacturing step of hot forging.

As a result, the individual needs of separate original equipment manufacturers (OEM) cannot be met with precision or with any one unit design, but each must be manufactured in the specific size required in that specific OEM application.

If machining is contemplated prior to the forging process, costly and time consuming chucking operations are required. Moreover, the cost of materials is also a factor, since over size workpieces must be employed to sustain the machining and forging techniques.

SUMMARY OF THE INVENTION

In accordance with the principles of the present invention it is contemplated that there be provided an adjustable, preset, threaded and torqued pedal rod assembled to a mean dimension supplied by the customer and then securely locked into firm assembly for utilization without further adjustment in the assembly line of the customer. It will be understood that the term "mean dimension" is the longitudinal dimension extending from a gauge point on the ball of the rod to the center of the opening in the head.

The pedal rod of the invention takes the form of a two piece rod wherein the two separate elements making up the rod can be manufactured from material capable of being processed and shaped to the requisite configuration without the necessity of hot forging or any other labor intensive machining operation.

Further, it is contemplated by the present invention that such two elements be inseparably joined together in a fully bonded relationship that is virtually indestructible, but which can be selectively adjusted before, or as part of, the bonding step, thereby to provide an adjustable length pedal rod which will be universally applicable to the OEM requirements of any and all vehicular motor car manufacturers.

The method steps employed in the practice of the present invention utilize automated machinery, eliminates the need for using ionized water, requires far less handling of the workpieces, and produces a product with such precision that scrap is reduced to a minimum and the need for inspection benches is reduced, if not eliminated entirely.

DESCRIPTION OF THE DRAWINGS

FIG. 1 is a side elevational view of an adjustable pedal rod provided in accordance with a first embodiment of the principles of the present invention and manufactured in accordance with the steps of the inventive method of this invention;

FIG. 2 is a view similar to FIG. 1 but showing some of the parts in partial cross-section to illustrate additional details of the invention;

FIG. 3 is a cross-sectional view taken on line III—III of FIG. 2.

FIG. 4 is a side elevational view of a second embodiment of the present invention wherein head part for an offset pedal rod is provided and manufactured in accordance with the inventive principles disclosed and claimed in the present application.

FIG. 5 is a plan elevational view of the offset pedal rod head part of FIG. 4.

FIG. 6 is an end elevational view of the head part of FIG. 5.

FIG. 7 is a partial view of a third embodiment of the present invention utilizing an alternative form of head part wherein a clevis configuration may be optionally provided.

DETAILED DESCRIPTION OF THE PREFERRED EMBODIMENTS

Figure 8:
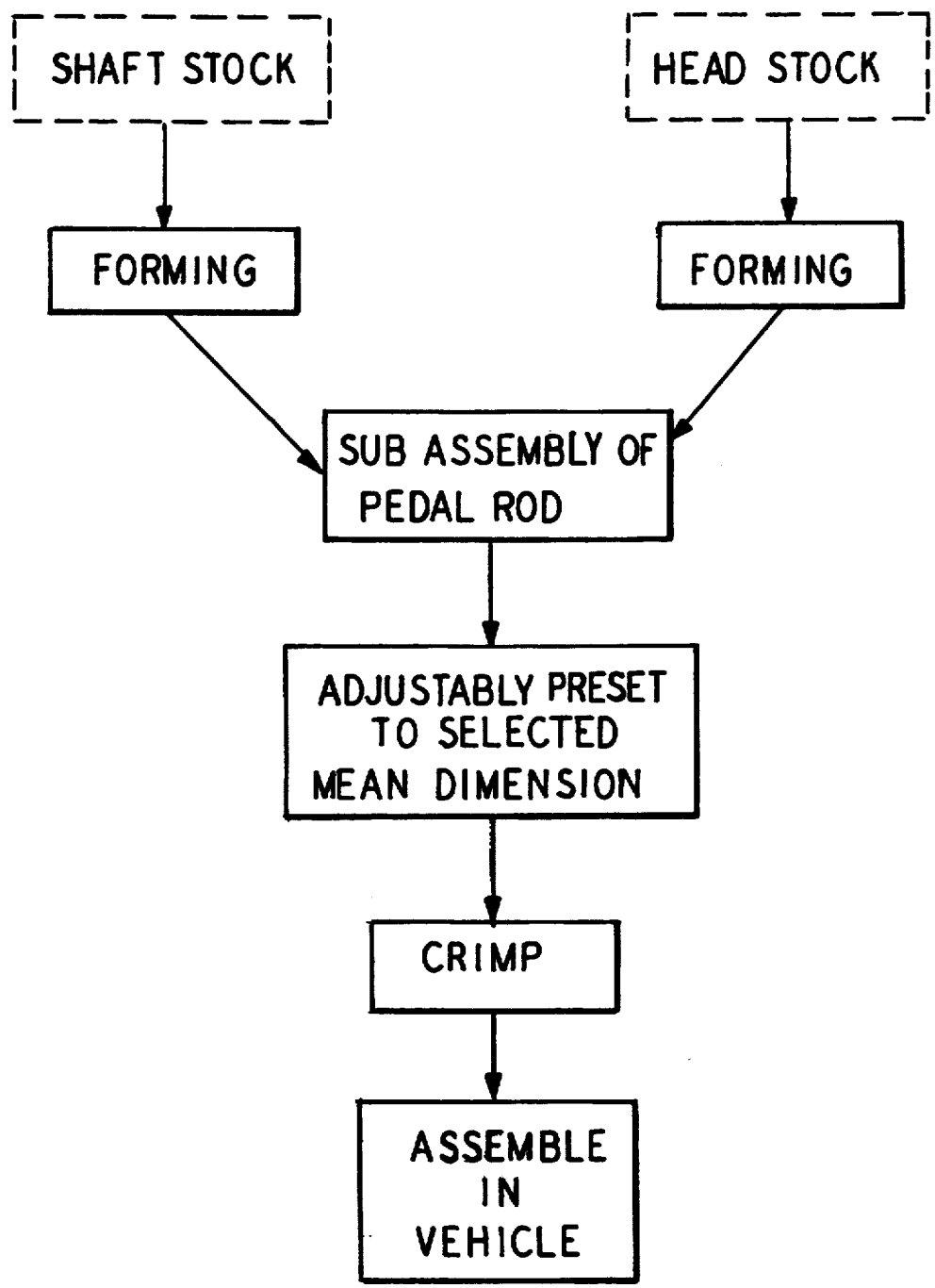
FIG. 8 is a flow chart schematically plotting the steps of the method of the present invention used in making all three embodiments of the present invention.

Prior art artisans in the field of automotive engineering have generally regarded the availability of an adjustable pedal rod as limited because such a rod would be too costly. Further the use of a multi-piece adjustable rod requiring adjustment by the auto manufacturer would slow down the assembly line of the OEM provider.

However, the conceptual basis of the present invention is to "pre-set" the pedal rod in the plant of the sub-contractor supplier of an OEM manufacturer to a selectively specified mean dimension of the OEM customer's choosing by threading the head into the shaft to achieve a preselected pre-set mean dimension as specified by the particular OEM manufacturer and torquing the parts to 5–40" lbs. or more and thoroughly crimping the selectively adjusted parts into firm assembly with one another for maximum structural and functional integrity.

Referring to the drawings, the objects of the present invention are realized by providing a pedal rod which is shown generally at 10 and comprises essentially two components or elements or parts which may be referred to as the head part 11 and the shaft part 12.

In the pedal rod designs currently used and preferred by most U.S. auto manufacturers the head part 11 takes the form of unitary flat stock having a through opening 13 extending therethrough, by means of which the pedal rod may be operatively connected in the actuating train of a motion mechanism actuated by the operator of the vehicle.

In the pedal rod designs of many foreign auto manufacturers the head part 11 takes the form of a clevis 11a (FIG. 6) provided with a central bight portion 14 from which extends a pair of spaced apart parallel arms 16 and 17, each of the arms having a co-axially disposed opening 13a formed therein by means of which the pedal rod may be operatively connected in the actuating train.

Thus, it is contemplated by the present invention that the head part of the pedal rod may be optionally selected in either the single bar form of FIGS. 1 and 2, the offset bar form of FIGS. 4, 5 and 6, or the clevis form of FIG. 7. In all forms of the pedal rod, the construction of the shaft part 12 is the same.

For example, it is contemplated by the present invention that all hot forging operations be completely eliminated in the fabrication of the pedal rod 10. To achieve that objective, a conventionally available metal bar stock for the shaft and metal flat stock for the head are utilized. While any suitable ductile metal material may be selected, an exemplary form of material successively employed in the practice of the present invention could be steel exhibiting the characteristics 1010 to 1020 steel heads, for straight rods of Rockwell "B" 95–105 12L14 steel for the shafts 12, 1010 to 1020 steel for the straight rod heads 11 and 8620 steel for the offset rod heads 111 described below.

The workpiece (head 11) is formed and shaped in a progressive die press machine which can be completely automated and computer controlled so as to conduct as many sequential operations successively as may be selectively programmed. Then, the shaft 12 is formed in an automatic screw machine to accurately and precisely form a ball 20 at one end of the workpiece and drill a hole and internally thread the hole at the other end.

It may be noted that many pedal rods in current usage have a ball at one end corresponding to the ball 20 since it customarily forms a component of a ball joint in which it is coupled to other elements of the motion train of which the pedal rod forms a part.

With the present invention, machining and forming the ball 20 will insure the required accuracy without necessitating further operations.

Extending axially away from the ball 20 is a reduced diameter portion 21 which terminates in an outwardly diverging tapered section 22. The tapered section merges into a shank portion 23 which is of a uniform diameter throughout its length and terminates in an end wall 24.

If required, in smaller diameter rods, a spring stop 25 may be formed on the shaft 12 by extrusion in accordance with my allowed U.S. patent application Ser. No. 07/833,665, now issued on Jul. 27, 1993 as U.S. Pat. No. 5,230,134 "A Method of Making a Pedal Rod which is incorporated herein by reference.

The end wall 24 is drilled and tapped to form an internally threaded opening identified in the drawings at 26 and having helical threads identified at 27. If desired, the shaft part 10 may be zinc plated with a coating in the range of from about 0.0002 inches–0.0003 inches and yellow chromate dipped.

The head parts 11 or 11a are similarly made without the necessity of any hot forging operations.

In the case of the flat stock head 11, a flat piece of bar stock is cut, shaped and/or punched to provide the flat bar shaped head 11 with the through opening 13. Again, any suitable form of ductile steel may be employed and an exemplary material that has been successfully employed is 1010–1020 steel.

The head 11 may have a flat or a curved wall 30 formed at one end as specified by the individual OEM while the wall opposite is a straight wall 31 with rounded fillets 32 at the respective corners. The straight wall 31 is joined to the curved wall 30 by a pair of side walls 33 and 34.

The center of the straight wall is characterized by a projecting stud or lug 36 on which stud or lug portion is formed a screw thread means which may take the form of external helical screw threads or screw thread segments identified at 37.

In forming the screw thread means 37, either an automatic machine operation may be utilized to form threads or thread segments in a rotational manner, or else the methods and equipment of my earlier U.S. Pat. No. 4,901,426 may be employed to form the threads or thread segments of the screw thread means 37 by pressing and without rotation.

Once the head part 11 and the shaft part 12 are fabricated to the form as described above in the plant of the supplier, the two parts are assembled by threading the external threads or thread segments 37 on the projection 36 of the head part 11 into the internal threads or thread segments 27 in the recessed opening 26 in the end wall 24 of the shaft part 12.

It will be understood that the respective threaded portions 27 and 37 may be formed in such a manner as to be matched or intentionally mismatched to afford a selective locking effect as the two parts 11 and 12 are threadedly joined together. In any event, the head part 11 is joined to the shaft part 12 and the axial length adjustment of the resulting sub-assembly is selectively pre-set to a pre-determined mean dimension of the OEM customer's choice. The term "mean dimension," as used by those versed in the pedal rod art, applies to the longitudinal dimension MD extending axially between the center of the opening 13, or 13A, as the case may be, in the head part 11, and a gauge point on the ball 20 of the shaft part 12. The range of adjustment available for example may be within an axial length of from about + thirty five one thousandths inches (+0.035 inches) to minus thirty five one thousandths inches (−0.035 inches) or other range as specified by the OEM (shown in exaggerated positions of adjustment at MDA and MDB). In effecting the presetting with mismatched thread segments, the two parts are torqued to a 5–40 inches lbs. as the head 11 is threaded into the shaft 12.

Upon completing the length adjustment to the predetermined and selected mean dimension, the two parts 11 and 12 are crimped as shown by pressing or swaging one or more axial crimping grooves 40 disposed at circumferentially spaced places around the shank 23 of the shaft part 12 inwardly of the end wall 24. At each place the crimped groove extends radially inwardly (FIG. 3) to deform the threads or thread segments 27 into the threads or thread segments 37 so securely that the rod 10 could not come apart into its constituent parts without deliberately and destructively breaking the rod into separate pieces. While FIG. 3 shows two crimping grooves located diametrically opposite one another, it will be understood that any selected number of places may be crimped, for example, four places located at ninety degree spacings may be utilized to insure good bonding between the shaft and head parts.

Such firm assembly solves the assembly line problems of the OEM manufacturer since there is no need to slow down the assembly line for the purpose of effecting time consuming adjustments, since all of the pedal rods are in a ready to install state.

Turning now to FIGS. 4 and 5 of the drawings, there is disclosed an alternative form of the invention wherein the principles of the present invention are applied to an offset pedal rod shown generally at 110 and having a head part 111 and a shaft part 112.

In the head part 111, a main body portion is shown at 130 in which is formed an opening 113. A coupling arm is formed and extends in an angularly offset direction as shown at 136. Projecting from the end thereof, is a two tiered lug 137 having a first outer diameter 138 formed with external threads or thread segments 139 at a first pitch diameter.

A smaller diameter forms a second part of the two tiered lug as at 140 and has external threads or thread segments as at 141 at a second pitch diameter. It will be understood that the counterpart shaft part 112 adapted to cooperate with the head part 110 will have corresponding threaded portions 127 (FIG. 4) to engage the threads 139 and 141. In the illustrated embodiment of the present disclosure the threaded portions take the form of thread segments, the shape and extent of which are clearly depicted in FIGS. 5 and 6. Such thread segments are conveniently made by pressure and without rotation, in following the methodology of the present invention. The different pitch diameters of the thread means permit convenient precision torque locking.

It will be appreciated by those versed in the art that all of the assembly work on the pedal rod of the present invention may be accomplished in the latest state of the art, precision, automated assembly equipment. What this means from a manufacturing technique point of view is that the present invention permits the use of standardized heads and selected shafts which can be made into a pedal rod without ionized water or induction heaters and without inspection benches and with far less handling so that all Statistical Process Control (SPC) is built in and scrap should be reduced, if not eliminated.

The method steps described can be practiced without the necessity of annual electronic tube repairs for the induction heaters or ongoing die repairs and with consequent personnel and cost savings both for the supplier as well as for the OEM customer.

In summary, the method steps as contemplated by the present invention are set forth in a block diagram in FIG. 7. The two parts 11 and 12 start on separate paths and after initial forming, are sub-assembled into a unitary pedal rod 10.

The key step of torquing, adjusting and pre-setting the rod to the mean dimension chosen by the OEM customer then takes place. After presetting the pedal rod to the selected mean dimension, the two parts are securely crimped and permanently locked together so that the pedal rod is ready for installation in the vehicle of the OEM customer's manufacture.

Although various modifications might be suggested by those versed in the art, it should be understood that I wish to embody within the scope of the patent warranted hereon all such modifications as reasonably and properly come within the scope of my contribution to the art.

I claim as my invention:

1. A pedal rod comprising,
   a first head part having a through opening formed therein by means of which said first head part may be connected in an actuating train of a device to be actuated, said first head part having formed thereon a projecting lug formed with external screw thread means,
   a second shaft part having a ball at one end and having an internally threaded recess at its opposite end,
   said second shaft part receiving said external screw thread means of said lug of said first head part in said internally threaded recess to form an axially adjustable joint,
   said first head part and said second shaft part being axially and longitudinally adjustable to a desired preselected and predetermined mean dimension measured between said through opening and said ball by torquing the two pans and effecting an axial advance or retraction of the joint between the parts to a length correlated to the selected mean dimension; and
   a crimping groove formed in said second shaft part and extending radially inwardly into engagement with said first head part to securely lock said first head part and said second shaft part together,
   said first head part comprising an offset apertured body portion which is angularly offset from the axis of said second shaft pan and said projecting lug of said first head pan and is co-axial with said second shaft part.

2. An adjustable pedal rod as defined in claim 1 wherein said projecting lug constitutes a two tiered cylindrical part with external screw thread means of different size on the two tiers.

3. An pedal rod as defined in claim 1 wherein said first head part is characterized by the utilization of external screw thread means formed thereon by pressing without rotation.

4. A pedal rod comprising,
   a first head pan having a through opening formed therein by means of which said first head pan may be connected in an actuating train of a device to be actuated,
   said first head part having formed thereon a projecting lug formed with external screw thread means,
   a second shaft pan having a ball at one end and having an internally threaded recess at its opposite end,
   said second shaft pan receiving said external screw thread means of said lug of said first head part in said internally threaded recess to form an axially adjustable joint,
   said first head pan and said second shaft part being axially and longitudinally adjustable to a desired preselected and predetermined mean dimension measured between said through opening and said ball by torquing the two pans and effecting an axial advance or retraction of the joint between the parts to a length correlated to the selected mean dimension; and
   a crimping groove formed in said second shaft part and extending radially inwardly into engagement with said first head part to securely lock said first head part and said second shaft part together.
   said first head part comprising a clevis with two parallel apertured arms being co-axially apertured and thereby forming said through opening.

5. A pedal rod as defined in claim 4 wherein the extent of the mean dimension adjustment between said ball and said through opening is between plus 0.035 inches to minus 0.035 inches.

6. A pedal rod comprising a first shaft part and a second head part joined together by a threaded joint wherein:

the threaded joint comprises an externally threaded male part having external helical thread means and further comprises an internally threaded female socket having internal helical thread means of a first pitch diameter, a first section of said external helical thread means having a first pitch diameter corresponding to said first pitch diameter of said internally threaded female socket and further including a second section of external helical thread means at a second pitch diameter larger than the first pitch diameter, thereby to afford the user precision torque locking of said first shaft part and said second head part.

7. A pedal rod as defined in claim 6 wherein said male pan is characterized by the utilization of external helical thread means formed thereon by pressing without rotation.

8. A petal rod as defined in claim 6 wherein said first shaft part has a ball and said second head part has a through opening and wherein the longitudinal distance between said ball and said through opening constitutes a selectively adjustable mean dimension, said first shaft part and said second head part being axially and longitudinally adjustable to a desired preselected and predetermined mean dimension measured between said ball and said through opening by torquing first shaft part and said second head part relative to one another and the effecting relative axial advance or retraction at said threaded joint to the pe-selected mean dimension.

* * * * *